United States Patent von der Ohe et al.

[11] 4,090,836
[45] May 23, 1978

[54] INJECTION DIE CASTING APPARATUS, ESPECIALLY FOR MAKING MOLDED PARTS OF THERMOPLAST-STRUCTURAL FOAM

[75] Inventors: Walter von der Ohe; Hans-Jürgen Lange, both of Essen, Germany

[73] Assignee: Fried. KRUPP Gesellschaft mit beschrankter Haftung, Essen, Germany

[21] Appl. No.: 784,252

[22] Filed: Apr. 4, 1977

[30] Foreign Application Priority Data

Apr. 6, 1976 Germany .............. 2614707

[51] Int. Cl.² .............................. B29F 1/02
[52] U.S. Cl. ......................... 425/574; 425/588
[58] Field of Search ............ 425/567, 576, 574, 542, 425/575, 588, 594

[56] References Cited

U.S. PATENT DOCUMENTS

| | | | |
|---|---|---|---|
| 3,205,536 | 9/1965 | Funck | 425/588 X |
| 3,335,464 | 8/1967 | Schwartz | 425/567 |
| 4,022,561 | 5/1977 | Strong | 425/574 X |

FOREIGN PATENT DOCUMENTS

| | | | |
|---|---|---|---|
| 257,916 | 10/1967 | Austria | 425/576 |
| 1,325,875 | 3/1963 | France | 425/574 |
| 1,110,303 | 9/1966 | United Kingdom | 425/576 |

Primary Examiner—Francis S. Husar
Assistant Examiner—William R. Briggs
Attorney, Agent, or Firm—Walter Becker

[57] ABSTRACT

An injection die casting apparatus, especially for making molded articles especially of thermoplast-structural foam, with at least two closing units arranged adjacent to each other and provided with molds and mold chucking plates, and also equipped with an injection unit comprising an extruder, a pertaining charging hopper, a deflecting head and a hydraulic accumulator. The upper surfaces of the closing units have centrally arranged therein injection openings, and the injection unit is pivotable about a vertical axis and tiltable about a horizontal axis.

4 Claims, 2 Drawing Figures

INJECTION DIE CASTING APPARATUS, ESPECIALLY FOR MAKING MOLDED PARTS OF THERMOPLAST-STRUCTURAL FOAM

The present invention relates to an injection die casting apparatus, especially for making formed parts of thermoplast-structural foam, which injection die casting apparatus comprises at least two closing units arranged adjacent to each other and provided with tool molds and mold chucking plates, and also has an injection unit comprising an extruder and a pertaining charging hopper as well as a deflecting head and a hydraulic accumulator.

With injection die casting apparatuses of this type, it is desirable to produce workpieces with a symmetric sealing density profile. This object can be realized by injecting the material centrally and vertically into the molds because in such an instance the influence of gravitation upon the material is uniformly distributed over the mold cross section.

The poor heat conductivity of synthetic material will when processing synthetic material require relatively long cooling-off periods and thus correspondingly long production times. In an attempt to overcome this drawback, it has been suggested to combine at least two closing units with an injection unit. Injection casting and thermoplast structural form installations have become known which have a plurality of closing units combined with an injection unit. With installations of this type which have vertically arranged closing units, the material is horizontally injected into the separating plane between the mold sections. With the likewise known machines provided with horizontally arranged closing units, the material is injected centrally but likewise horizontally. In both instances, in particular, however, when processing foamable thermoplasts, where the mold is filled with material only up to about 75% of its volume, no symmetric density profile of the workpiece is obtained because the workpiece is injected perpendicular to the direction of gravity. The arrangement with horizontally located closing units additionally requires considerable space.

Another heretofore known injection casting plant comprises a single vertically arranged closing unit with an injection unit arranged below and centrally to said closing unit. Due to the coordination of an injection unit with only one closing unit, the plasticizing unit and the installed output are only poorly utilized. Another drawback of this arrangement is also seen in the necessity to place the injection unit below the floor, which arrangement is necessitated by the relatively great height of the construction.

It is, therefore, an object of the present invention to provide an injection casting apparatus in which the above mentioned drawbacks will be avoided and which will require only a relatively small ground surface while the apparatus itself is simple in construction, and by means of which workpieces with symmetric density profiles can be produced.

These and other objects and advantages of the invention will appear more clearly from the following specification in connection with the accompanying drawing, in which.

Figure 1:
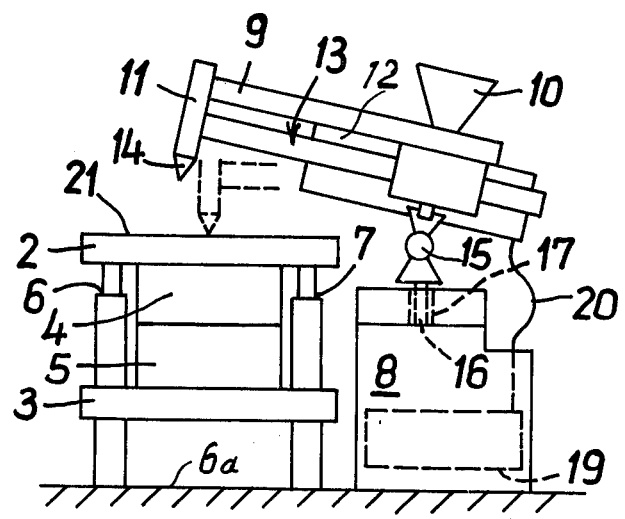
FIG. 1 represents a diagrammatic side view of an injection casting apparatus according to the invention.

The injection die casting apparatus according to the invention, especially for making shaped parts of thermoplast-structural foam is characterized primarily in that the closing units are arranged perpendicular, and their injection openings are arranged centrally on the upper surface of said closing units, while the injection unit is tiltable about a horizontal axis and is pivotable about a vertical axis while being arranged on a base.

According to a further development of the invention, it is provided that each closing unit is equipped with a maximum of two mold chucking plates.

It is furthermore advantageous to connect the hydraulic accumulator with its hydraulic connections rigidly to the injection unit and to make flexible the connection between the accumulator and a gas reservoir arranged in said base. The advantage realized with the apparatus according to the present invention consists primarily in that workpieces with symmetric density profiles can be economically produced by a compact method of construction, an advantageous use of the installed driving power and by an easy handling of relatively large volume parts during the opening of the mold.

Referring now to the drawing in detail, the injection die casting apparatus comprises two vertically arranged closing units 1 and 1' respectively which are arranged directly adjacent to each other and are spaced from each other only by a narrow gap s. Each of the closing units has an upper and a lower mold chucking plate 2 and 3 respectively with pertaining upper and lower tool forms 4 and 5 respectively. By means of vertical column guides 6, 7, the mold chucking plates 2, 3 are adapted with the pertaining tool forms 4 and 5 to open and close in a manner known per se. In alignment with the gap s, and adjacent the two closing units, there is arranged a die casting unit 13 on a base 8. In the base 8 there is advantageously provided a portion of the drive. The preferably hydraulically operable casting or injection unit 13 comprises an extruder 9 with pertaining charging hopper 10, a deflecting head 11, and a hydraulic accumulator 12. The accumulator 12 which is rigidly connected to the injector unit 13 is by means of a rigid conduit 12a hydraulically connected to the injection unit 13. That end of the deflecting hand 11 which faces the closing unit has arranged thereon an injection nozzle 14 which may be of any well-known type adapted to be opened and closed. The unit 13 is mounted on a horizontal joint 15 which in its turn through the intervention of a vertical shaft 16 rests in a corresponding bearing 17 of the base 8.

Figure 2:
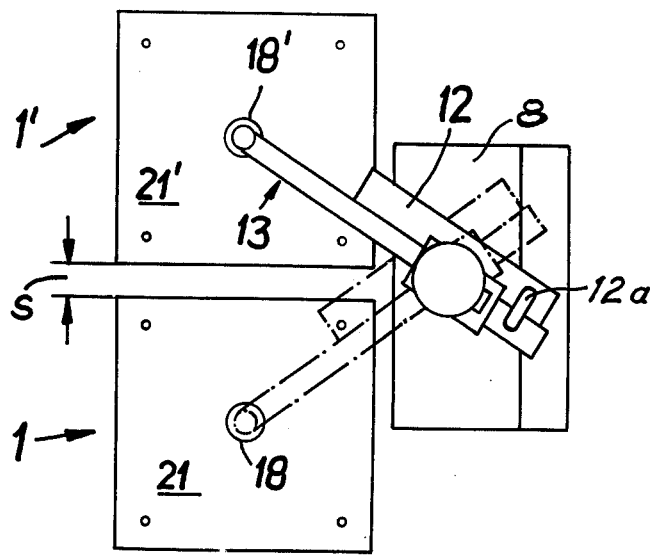
FIG. 2 is a diagrammatic top view of the apparatus of FIG. 1.

The injection unit starts for instance to inject material into the forms 4 and 5 of the closing unit 1'. After completion of this injection operation, the injection unit is about the horizontal joint 15 tilted upwardly from the position (FIG. 1) indicated in dash lines into the position indicated in full lines. After this upward tilting, the injection unit 13 is pivoted about shaft 16 above the likewise centrally arranged injection opening 18 of the closing unit 1, and after having been moved into the dot-dash line position shown in FIG. 2, the injection unit 13, is lowered. While the molds 4 and 5 of the injection unit 1 are being filled with material, the closing unit 1' is opened for withdrawal of the workpiece which has cooled off in the meantime. When the forms or molds 4 and 5 of the closing unit 1 are filled with material, the closing unit 1' is closed again, the injection unit 13 is again tilted upwardly, is lowered over the injection unit 18', and the automatic cycle is started again.

In this connection, it will be appreciated that the closing units 1, 1' are operable vertically which means that the molds 4 and 5 for purposes of opening and closing are moving perpendicular to the supporting or floor surface 6a.

For purposes of uniformly filling the mold with material, it is possible during the vertical injection of the material from above, to take advantage of the gravitation upon the material. The required injection pressure can for this reason be kept lower than is the case with other arrangements of the injection opening. As a result thereof, it is also possible to lower the closing forces. The mechanical column guides 6, 7 of the chucking plate 2 can be simplified and as an advantage of the present invention, generally two plate-closing units will suffice whereas with the heretofore known arrangements of the injection openings, 3 plate-closing units are necessary.

It will be appreciated that, when with the vertical injection, the injected material has through an opening entered the mold 4, it will then by gravitation be distributed over the entire hollow space in the upper and lower molds 4 and 5 respectively.

For purposes of obtaining a necessary high injection speed, a hydraulic accumulator 12 is provided which is fed and preloaded from a gas reservoir 19 through a flexible conduit 20. An oil column used directly for injection of the material is fed by a pump against the gas pressure in the accumulator so that the gas pressure increases. When the injection unit is placed above the entrance opening of a closing unit, and when the injection nozzle is opened, the highly tensioned gas presses the material through the liquid column and the injection nozzle 14 into the corresponding closing unit. The accumulator is directly connected to the injection unit so that within the region of the high oil pressure merely short and rigid connections will suffice, whereas the flexible conduit from the tiltable and pivotable unit to the gas reservoir 19 can be arranged within the region of the lower gas pressure.

It is, of course, to be understood that the present invention is, by no means, limited to the specific showing in the drawing, but also comprises any modification within the scope of the appended claims.

What we claim is:

1. An injection die casting apparatus, especially for producing formed articles of thermoplast-structural foam, which includes: at least two closing units arranged adjacent to each other and respectively provided with mold chucking plates adapted to receive and support molds; an injection unit comprising an extruder with a charging hopper mounted thereon and a deflecting head connected thereto and a hydraulic accummulator operative therewith, said closing units having upper surfaces with centrally arranged injection openings respectively; supporting means arranged laterally of said at least two closing units, first bearing means supported by said supporting means and supporting said injection unit for rotation about a vertical axis, second bearing means associated with said first bearing means and supporting said injection unit for pivotal movement of the latter about a horizontal axis, and means operatively associated with said mold chucking plates for moving said mold chucking plates toward and away from each other in a vertical direction substantially parallel to said first mentioned vertical axis.

2. An apparatus according to claim 1, in which each of said closing units is provided with a maximum of two mold chucking plates.

3. An apparatus according to claim 1, which includes hydraulic connecting means rigidly interconnecting said hydraulic accumulator and said injection unit, and also includes a gas reservoir and flexible connecting means connecting said gas reservoir with said accumulator.

4. An apparatus according to claim 1, which includes rigid conduit means and in which said injection unit is hydraulically operable and is hydraulically connected to said accumulator by means of said rigid conduit means.

* * * * *